(12) United States Patent
Chen

(10) Patent No.: US 6,834,119 B2
(45) Date of Patent: Dec. 21, 2004

(54) METHODS AND APPARATUS FOR MATCHING MULTIPLE IMAGES

(75) Inventor: George Q. Chen, San Jose, CA (US)

(73) Assignee: STMicroelectronics, Inc., Carrollton, TX (US)

( * ) Notice: Subject to any disclaimer, the term of this patent is extended or adjusted under 35 U.S.C. 154(b) by 646 days.

(21) Appl. No.: 09/825,266

(22) Filed: Apr. 3, 2001

(65) Prior Publication Data

US 2002/0172413 A1 Nov. 21, 2002

(51) Int. Cl.[7] .................................................. G06K 9/00
(52) U.S. Cl. ....................... 382/154; 382/201; 382/218; 356/419
(58) Field of Search .................................. 382/103, 154, 382/159, 181, 195, 199, 201–203, 206, 209, 216–218, 220, 254, 285, 291; 345/418, 419, 42, 51, 169; 356/12; 348/48

(56) References Cited

U.S. PATENT DOCUMENTS

| | | | | |
|---|---|---|---|---|
| 4,982,438 A | * | 1/1991 | Usami et al. | 382/154 |
| 5,475,422 A | * | 12/1995 | Mori et al. | 348/48 |
| 5,675,377 A | * | 10/1997 | Gibas | 348/47 |
| 5,850,463 A | * | 12/1998 | Horii | 382/118 |
| 6,665,440 B1 | * | 12/2003 | Zhang et al. | 382/209 |

OTHER PUBLICATIONS

Deriche, R., et al., "Robust Recovery of the Epipolar Geometry for an Uncalibrated Stereo Rig," Proc. European Conference on Computer Vision, 1994, pp. 567–576.
Torr, P.H.S., et al., "Robust Parameterization and Computation of the Trifocal Tensor," Image and Vision Computing, vol. 15, No. 8, Aug. 1997, pp. 591–605.
Chen, Q., et al., "Efficient Iterative Solutions to M–View Projective Reconstruction Problem," Proc. Computer Vision and Pattern Recognition 1999, vol. II, pp. 55–61.

* cited by examiner

Primary Examiner—Yon J. Couso
Assistant Examiner—Sheela Chawan
(74) Attorney, Agent, or Firm—Lisa K. Jorgenson; Stephen C. Bongini

(57) ABSTRACT

An image processing system detects a plurality of image features in a first image corresponding to a first view of a scene, and a plurality of image features in a second image corresponding to a second view of the scene. The second image deviates from the first image as a result of camera relative motion. The system determines a two-view correspondence resulting in a potential match set having a maximum average strength of correspondence based at least in part on the total number of matching neighbor candidate image features. Additionally, a multiple-view correspondence between images results in a potential match set based at least in part on a computation of reprojection error for matched points that resulted from a projective reconstruction of the potential match set.

24 Claims, 11 Drawing Sheets

METHODS AND APPARATUS FOR MATCHING MULTIPLE IMAGES

BACKGROUND OF THE INVENTION

1. Field of the Invention

This invention generally relates to the field of image processing systems and methods, and more particularly relates to methods of matching image features across multiple image views.

2. Description of Related Art

There are many image processing applications where multiple images of scenes are matched to identify common image information across the different images. For example, one way of creating three-dimensional (3-D) digital content is by analyzing multiple images of a scene. The main issue here is image matching—how to automatically find the corresponding relationship among the projections in different images of the same points.

For example, as shown in FIG. 1, a left eye 102 is seen in three images 104, 106, 108, of the same scene 110. The left eye 102 appears as three respective image features 112, 114, 116, in the three images 104, 106, and 108, as shown. Image matching methods attempt to establish links 118, 120 among the three respective image features 112, 114, 116, that are common across the three images 104, 106, 108, of the same scene 110. The significance of image matching is that once a correspondence information is established, it is possible to recover the 3-D coordinates of the matched points from which more complete geometric structures can be reconstructed.

Two prior art methods have been reported which work on image pairs or triplets, respectively. For example, see the publication by R. Deriche, Z. Zhang, Q.-T. Luong and O. Faugeras, "Robust Recovery of the Epipolar Geometry for an Uncalibrated Stereo Rig," Proc. European Conference on Computer Vision '94, pp. 567–576. Additionally, see the publication by P. H. S. Torr and A. Zisserman, "Robust Parameterization and Computation of the Trifocal Tensor," Image and Vision Computing, Vol. 15, No. 8, August 1997, pp. 591–605.

The basic approach is, first, to generate a number of candidate correspondences based on proximity and similarity; and then, to select the correct ones from all candidates by making sure that they satisfy an algebraic constraint (epipolar geometry in the two-view case, and trifocal tensor in the three-view case). In the terminology of estimation theory, the correct candidates are called inliers, whilst the wrong ones are called outliers. The robustness of a method is its ability to detect outliers. Unfortunately, the robustness of the two prior art methods mentioned above is limited because the constraints they are enforcing are ambiguous sometimes. That is, there may be multiple pairs or triplets of correspondences that satisfy the same instance of a constraint. Additionally, those constraints have singular conditions, e.g. when the camera positions are linear or planar. Under such cases, these two methods simply fail to work.

Therefore a need exists to overcome the problems with the prior art as discussed above, and particularly for a method and apparatus that can more successfully match features across multiple images.

SUMMARY OF THE INVENTION

According to a preferred embodiment of the present invention, an image processing system comprises a memory; a controller/processor electrically coupled to the memory; an image feature detector, electrically coupled to the controller/processor and to the memory, for detecting a plurality of image features in a first image corresponding to a first view of a scene, and for detecting a plurality of image features in at least a second image corresponding to a respective at least a second view of the scene, wherein the at least a second image deviates from the first image as a result of camera relative motion; and an image matching module, electrically coupled to the controller/processor and to the memory, for determining a two-view correspondence resulting in a potential match set of candidate image features between the first image and the at least a second image, wherein the potential match set is determined to have a maximum average strength of correspondence based at least in part on the total number of matching neighbor candidate image features for each match of the potential match set.

According to a preferred embodiment of the present invention, an image processing system comprises a memory; a controller/processor electrically coupled to the memory; an image feature detector, electrically coupled to the controller/processor and to the memory, for detecting a plurality of image features in a first image corresponding to a first view of a scene, and for detecting a plurality of image features in at least a second image corresponding to a respective at least a second view of the scene, wherein the at least a second image deviates from the first image as a result of camera relative motion; and an image matching module, electrically coupled to the controller/processor and to the memory, for determining a multiple-view correspondence between the plurality of detected features in the first image and the plurality of detected image features in the at least a second image, resulting in a potential match set of candidate image features between the first image and the at least a second image, wherein the potential match set is based at least in part on a computation of reprojection error for matched points that resulted from a projective reconstruction of the potential match set.

DESCRIPTION OF THE PREFERRED EMBODIMENTS

Figure 1:
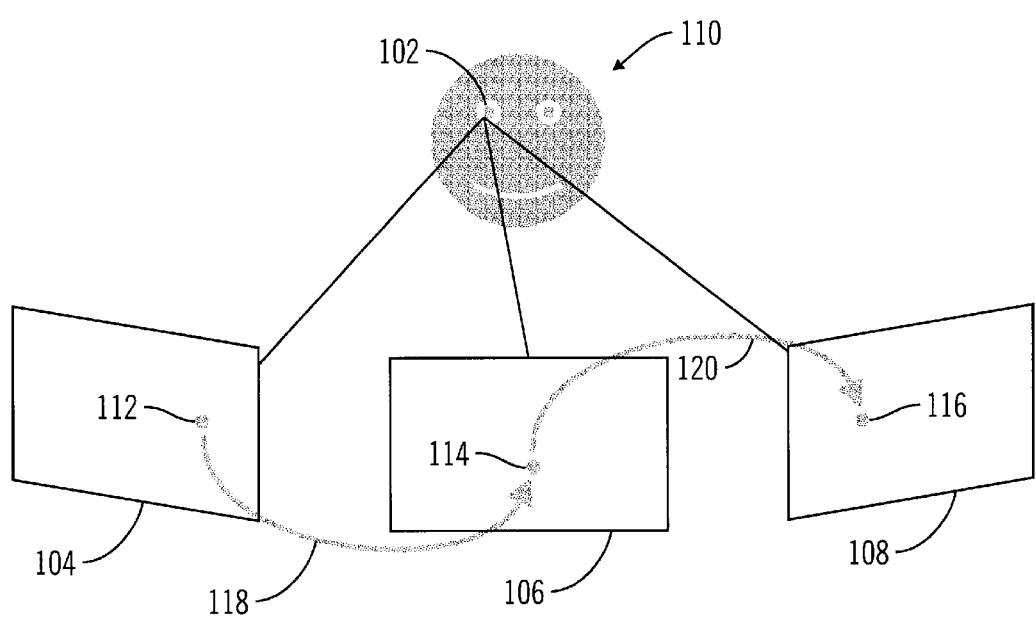
FIG. 1 is a perspective view diagram illustrating three images constituting three views of an exemplary scene.
Figure 2:
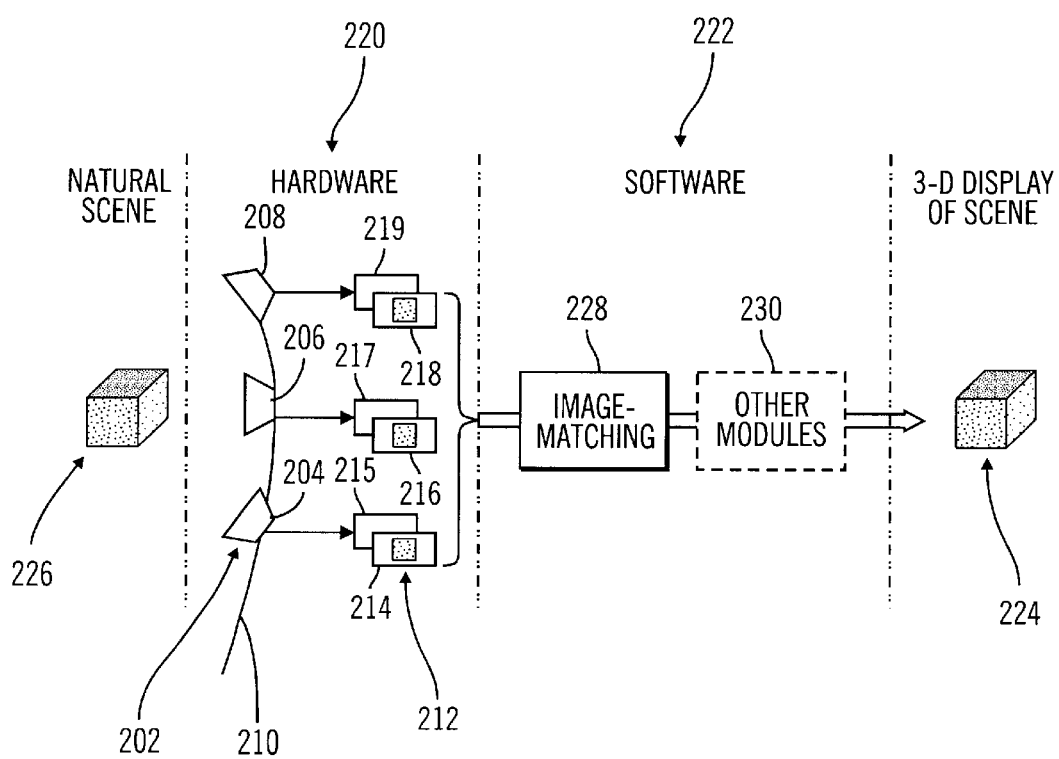
FIG. 2 is a functional block diagram showing an exemplary image matching system, according to a preferred embodiment of the present invention.

According to a preferred embodiment of the present invention, as shown in FIG. 2, an exemplary image matching system 200 comprises a set of digital (still or video) cameras 202, three cameras 204, 206, 208, being shown, which are arranged with different pose and are electronically synchronized such as via an electrical signal bus 210. At any time instant, the cameras 202 generate a set of images 212, such as three images 214, 216, 218, being shown for the three respective digital capture interfaces 215, 217, 219, for the three cameras 204, 206, 208. Each of the set of images 212 deviates from the other images in the set of images 212 by camera relative motion. For example, the first image 214 and the second image 216 can deviate from one another by a distance between corresponding feature points found on both images 214, 216, due to the different poses of the cameras 204, 206, relative to a scene 226. This camera relative motion between the two images 214, 216, can be represented by a motion vector between feature points that correspond (i.e., that match) between the two images 214, 216. Additionally, although still cameras 204, 206, 208, and a still scene 226 are shown in this example, it should become obvious to one of ordinary skill in the art in view of the teachings herein that any combination of still and/or moving scene 226 and/or cameras 204, 206, 208, can be represented in accordance with alternative embodiments of the present invention. For example, a moving object scene 226 and utilizing still cameras 204, 206, 208, may be perfectly desirable for certain applications of the present invention. Therefore, the term camera relative motion, as used herein, is intended to broadly cover all such alternative embodiments of the present invention wherein any combination of still and/or moving scene 226 and/or cameras 204, 206, 208, can be represented.

The three respective digital capture interfaces 215, 217, 219, are communicatively coupled to a computer system (not shown in FIG. 2). The set of images 212 is then processed by the hardware 220, the computer system (not shown), and the software 222 of the system 200 to output 3-D information 224 of the scene 226 observed by the set of cameras 202. The software 222 preferably comprises a point detection and matching module 228, as will be discussed in more detail below. Other software modules 230 provide additional processing of the image information after the image feature points have been detected and matched across views.

Figure 3:
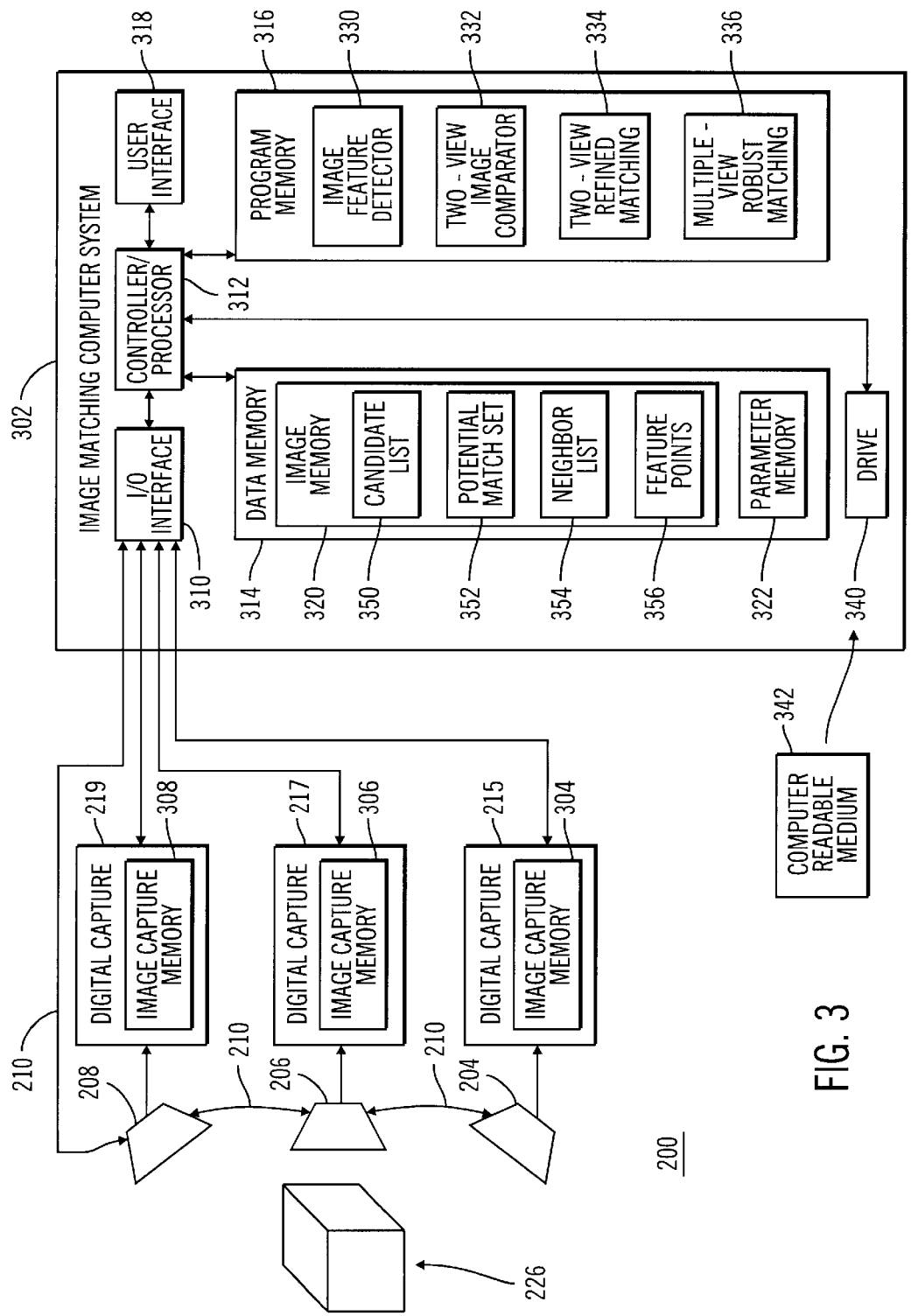
FIG. 3 is a functional block diagram illustrating a more detailed view of the exemplary image matching system of FIG. 2, according to a preferred embodiment of the present invention.

FIG. 3 illustrates a more detailed view of the image matching system 200 of FIG. 2, according to a preferred embodiment of the present invention. Each of the digital capture interfaces 215, 217, 219, includes respective image capture memory 304, 306, 308, for storing a captured image 214, 216, 218. The digital capture interfaces 215, 217, 219, are communicatively coupled to an input/output interface 310 of an image matching computer system 302. Additionally, the electrical signal bus 210 is communicatively coupled to the input/output interface 310. The image matching computer system 302 comprises a controller/processor 312 that is electrically coupled to data memory 314 and to program memory 316. The controller/processor 312 is also electrically coupled to a user interface 318 that presents information to a user, such as via a monitor display (not shown), and receives user input from the user such as via a keyboard (not shown) and a mouse (not shown).

The data memory 314 includes an image memory 320 for storing image information. The image memory 320 comprises data structures for a candidate list 350, a potential match set 352, a neighbor list 354, and a storage of feature points 356, that are used by the image matching functional module 228 as will be discussed in detail below. Additionally, the data memory 314 includes a parameter memory 322 where the image matching computer system 302 stores configuration parameters for the image matching system 200.

The program memory 316 provides computer program instructions for the controller/processor 312 for performing operational sequences for the image matching system 200, according to the preferred embodiments of the present invention. The program memory 316 includes four functional modules. The four functional modules are as follows: an image feature detector 330, a two-view image comparator 332 for matching pairs of images, a two-view refined matching handler 334, and a multiple-view robust matching handler 336. These four functional modules will be discussed in more detail below.

Additionally, the image matching computer system 302 preferably includes a drive 340 for receiving the computer readable medium 342. This provides a means of transferring of information with the image matching computer system 302. For example, computer programs (and updates thereto) can be provided to the image matching computer system 302 and stored in the program memory 316 via the computer readable medium 342 in a manner well known to those of ordinary skill in the art. Additionally, image information and related parameters can be transferred between the computer readable medium 342 and the data memory 314.

According to a preferred embodiment of the present invention, the point detection and image matching module 228 operates in the computer system 302 and is stored in the program memory 316 and consists of the four functional modules as follows: 1) an image feature detector 330, 2) a two-view image comparator 332 for matching pairs of images, 3) a two-view refined matching handler 334, and 4) a multiple-view robust matching handler 336. These four functional modules, according to one embodiment of the present invention, operate on image information in a series of four operational stages that progressively improve the correspondence of image information across a plurality of images representative of a scene. As a result of the fourth stage, i.e., the multiple-view robust matching handler 336, the correspondence of the image information across the plurality of images (views) is significantly improved over known prior art systems. This is a significant advantage of the present invention that is not available in known prior art image processing systems.

According to a preferred embodiment of the present invention, significant portions of the system 200 may be implemented in integrated circuits. For example, functional components of the computer system 302 may be implemented in at least one integrated circuit. Similarly, significant portions of the digital capture modules 215, 217, 219, can be implemented in at least one integrated circuit.

According to alternative embodiments of the present invention, the image matching system 200 may be implemented, for example, in devices such as three-dimensional scanners, facsimile machines, video communication equipment, and video processing equipment.

Typically, some potential matches of image features are found in the second stage, i.e., the two-view image comparator module 332 that provides a starting point for the next stage. All potential matches of image features are found in the third stage, i.e., the two-view refined matching handler module 334. At the end of this stage, the set of all potential matches (thus Potential Match Set) contains both inliers and outliers. The later stage 336 essentially removes the outliers. The third stage 334 advantageously reduces the contamination rate (ratio of outliers to all candidates) to less than 10% so that only a small number of iterations are needed in the fourth stage 336. This makes the overall approach very efficient and enhances the commercial viability of any implementation utilizing the present invention.

Single Image Feature Detection

A pixel in an image is defined as a feature point if it has intensity variations in at least two directions. For example, when a white corner appears in a black background, the corner pixel satisfies the feature definition. Intensity variation is calculated by convolving an image with the Sobel operators, one in the x direction, and the other in the y direction:

$$SobelX = \begin{bmatrix} \frac{1}{8} & 0 & -\frac{1}{8} \\ \frac{1}{4} & 0 & -\frac{1}{4} \\ \frac{1}{8} & 0 & -\frac{1}{8} \end{bmatrix}, SobelY = \begin{bmatrix} \frac{1}{8} & \frac{1}{4} & -\frac{1}{8} \\ 0 & 0 & 0 \\ \frac{1}{8} & -\frac{1}{4} & -\frac{1}{8} \end{bmatrix}$$

Figure 4:
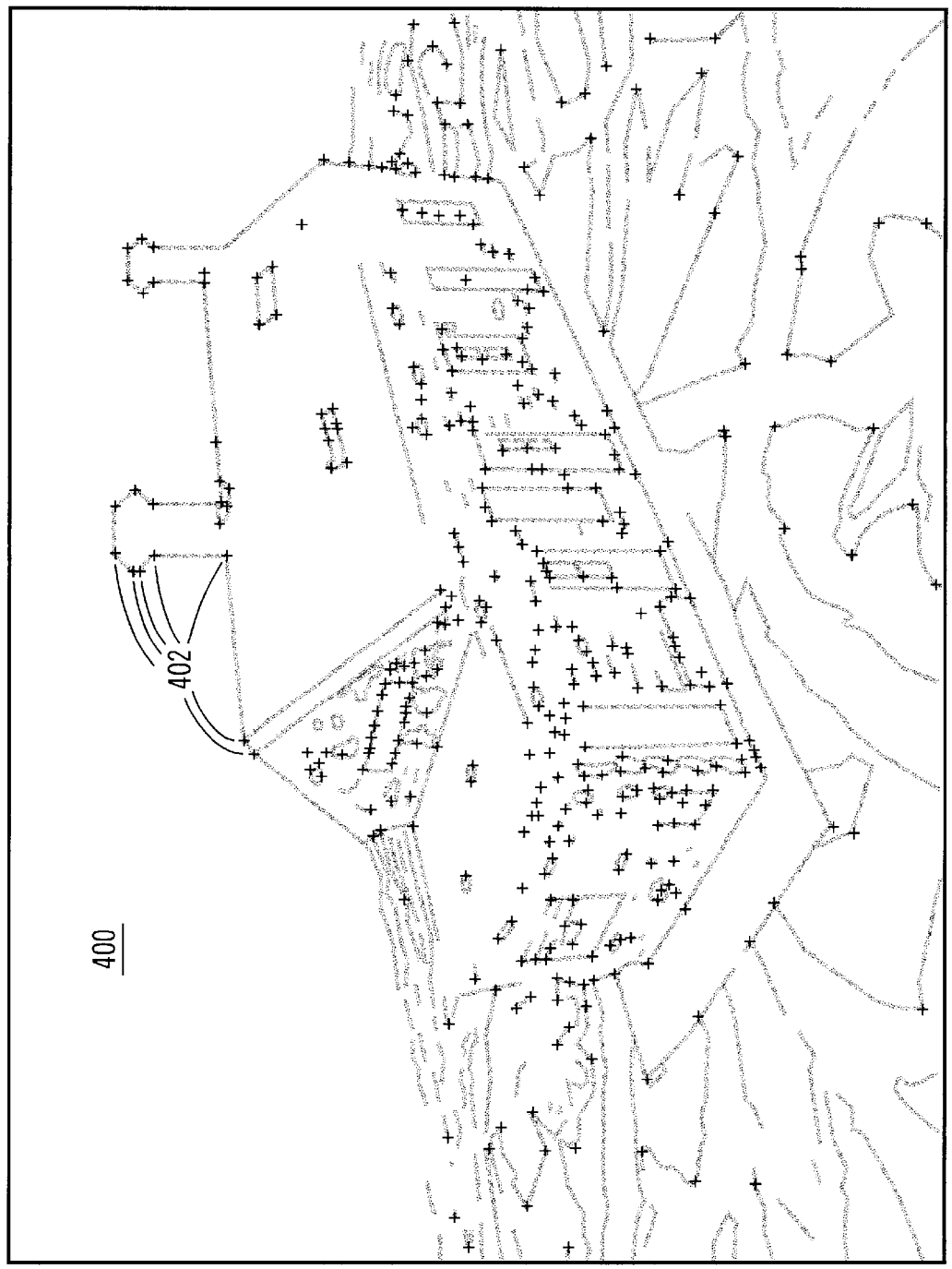
FIG. 4 shows an image of a scene, the image being processed by the exemplary image matching system of FIGS. 2 and 3 according to a preferred embodiment of the present invention.

Convolving the Sobel operators with image I (obtained from the Image Capture Memory 304, 306, 308 via the I/O interface 310) results in an intensity variation image V such that $V(u, v)=V_x^2(u, v)+V_y^2(u, v)$ where $V_x=I*SobelX$ and $V_y=I*SobelY$, and the symbol '*' represents convolution. Then, pixel (u, v) is considered as a feature if $V(u, v)>5\%\cdot max(V)$. For example, FIG. 4 illustrates an exemplary image 400 comprising a set of feature points (indicated by the crosses) 402 detected by this algorithm. This feature point detection method is performed by the first functional module, i.e., the image feature detector 330.

Two-View Matching Based on Cross-Correlation

Next, we discuss the second functional module, i.e., the two-view image comparator 332 that matches pairs of images. First of all, cross-correlation is a standard statistical quantity that is used here to describe the similarity of two features. Its value is ranged between −1 and 1. When it is −1, the two features are totally dissimilar. When it is 1, they are exactly same. Cross-correlation based matching is conducted between each pair of consecutive images. In so doing, in this example, the size of the cross-correlation window is chosen as 7.

Figure 5:
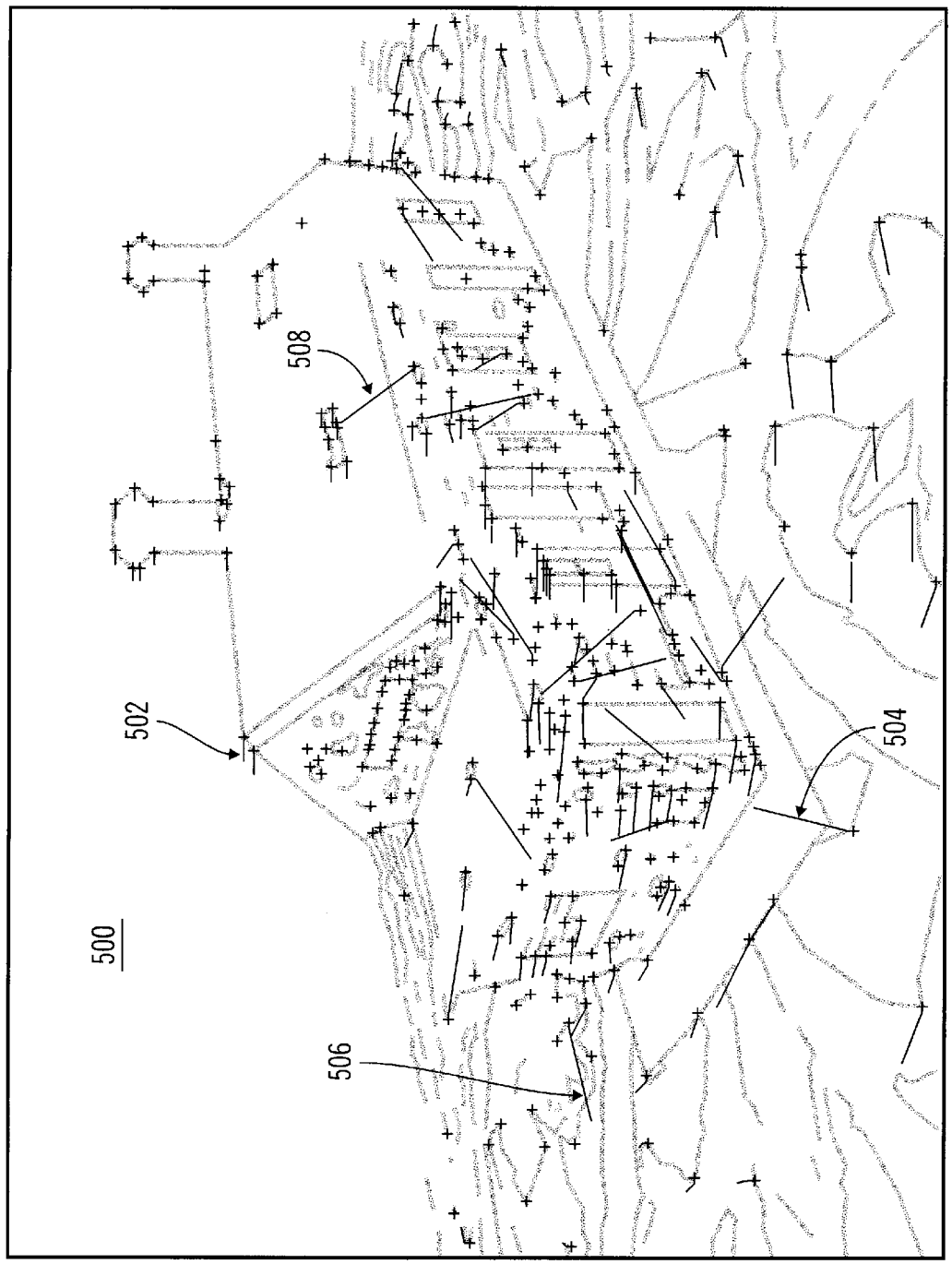
FIG. 5 shows a composite image representing two corresponding images of the scene of FIG. 4, the composite image illustrates motion vectors (both inliers and outliers) from a first image to a second image, the two images being processed by the exemplary image matching system of FIGS. 2 and 3 according to a preferred embodiment of the present invention.

For each feature in the one image, all features in the other image that fall in a window of size [w/2, h/2] are searched, where w and h are respectively the width and height of the image. A candidate match is recorded if their cross-correlation value is greater than 0.5. This establishes a candidate match list for each feature in each image. The list is sorted in descending order of the cross-correlation value. A potential match $(f_1, f_2)$ is recorded if and only if the head of $f_1$'s candidate match list is $f_2$, and vice versa. All potential matches form the Potential Match Set (PMS). FIG. 5 shows the PMS resulted after the cross-correlation stage, i.e., operation of two-view image comparator module 332. Here, a composite image 500 illustrates two corresponding images wherein the crosses represent starting points in a first image and the lines extending from the crosses represent motion vectors 502, 504, 506, 508. That is, if a feature point (a cross representing a point in a first image) is moved along the motion vector to the other end (of the vector), the stop position corresponds to a matching feature in the second image. In this example, since the camera motion is almost horizontal, only horizontal motion vectors are expected. For example, see an exemplary horizontal motion vector 502 illustrating an inlier. Significant deviations from the horizontal motion are considered as outliers. For example, see outlier motion vectors 504, 506, 508. Many such outliers are seen in FIG. 5. A main task of the following two stages is to find, from an existing PMS, a better PMS where the outliers are filtered out.

Two-View Iterative Refinement

Figure 6:
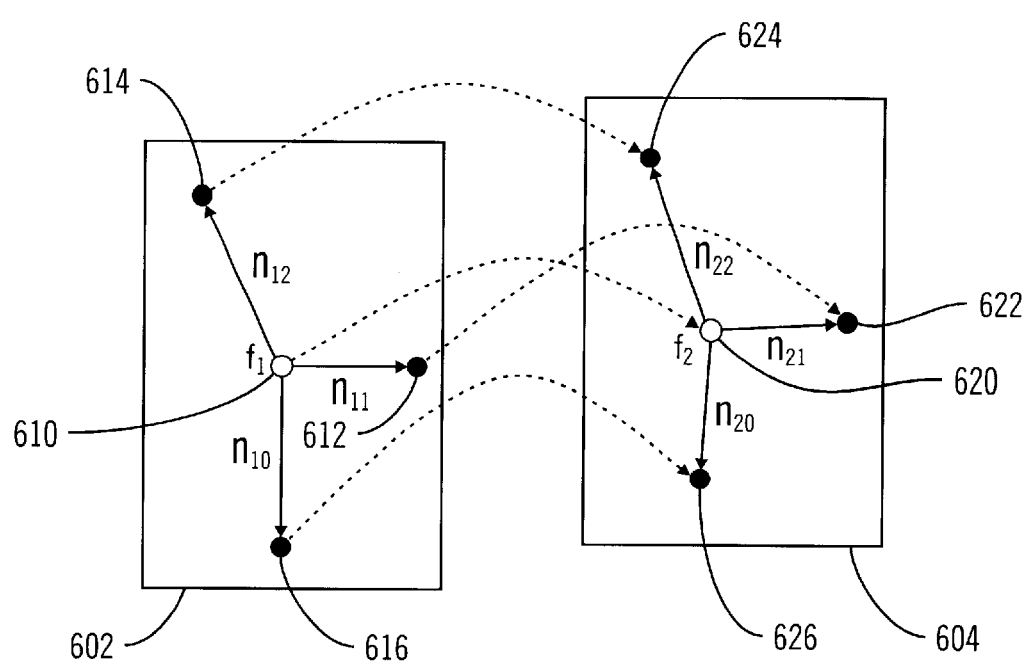
FIG. 6 shows two corresponding images of a scene, the two images being processed by the exemplary image matching system of FIGS. 2 and 3 according to a preferred embodiment of the present invention.

The previous stage 332 determines if two features match based on the value of cross-correlation over a small window (7×7). That is one of the reasons that many wrong matches are typically generated. Increasing the cross-correlation window, however, increases computation time exponentially. The tradeoff taken in this stage, i.e., two-view refined matching module 334, is to compare only feature pixels in a bigger pair of windows instead of all pixels. If, between two images 602, 604, two features 610, 620, match, all their neighbor features 612, 622, 614, 624, 616, 626, should also match. Thus the neighbors 612, 614, 616, in the first image 602 should form a similar geometrical relationship to the neighbors 622, 624, 626, in the second image 604 with respect to the features 610, 620, in consideration as a potential match, as illustrated in FIG. 6. This suggests that a neighbor list 354 is generated for each of the feature points 356 for each image. The feature points 356 and associated neighbor list 354 are stored in the image memory 320 for an image.

To quantify such a piece of heuristics, each potential match 610, 620, in a potential match set is assigned a strength which reflects the neighboring information. The more matching neighbors a potential match has, the higher the strength. The strength function is defined as:

$$Strength(f_1, f_2) = \sum_j \frac{CrossCorrelation(f_1 + n_{1j}, f_2 + n_{2j})}{1 + |n_{1j} - n_{2j}|},$$

where $n_{ij}$ (i=1,2; j=1,2, . . . ) is the vector from feature $f_i$ to its $j^{th}$ neighbor. It can be inferred from the formula that ($f_1$, $f_2$) attains its maximal strength, which equals to the number of neighbors, when all the neighbors cross-correlate perfectly and form exactly the same geometrical relationship. The average strength of a PMS is defined as the sum of strength of all potential matches in the entire set divided by the number of potential matches. The goal of the refinement stage is to iteratively maximize the average strength through the algorithm shown in FIG. 7.

Figure 7:
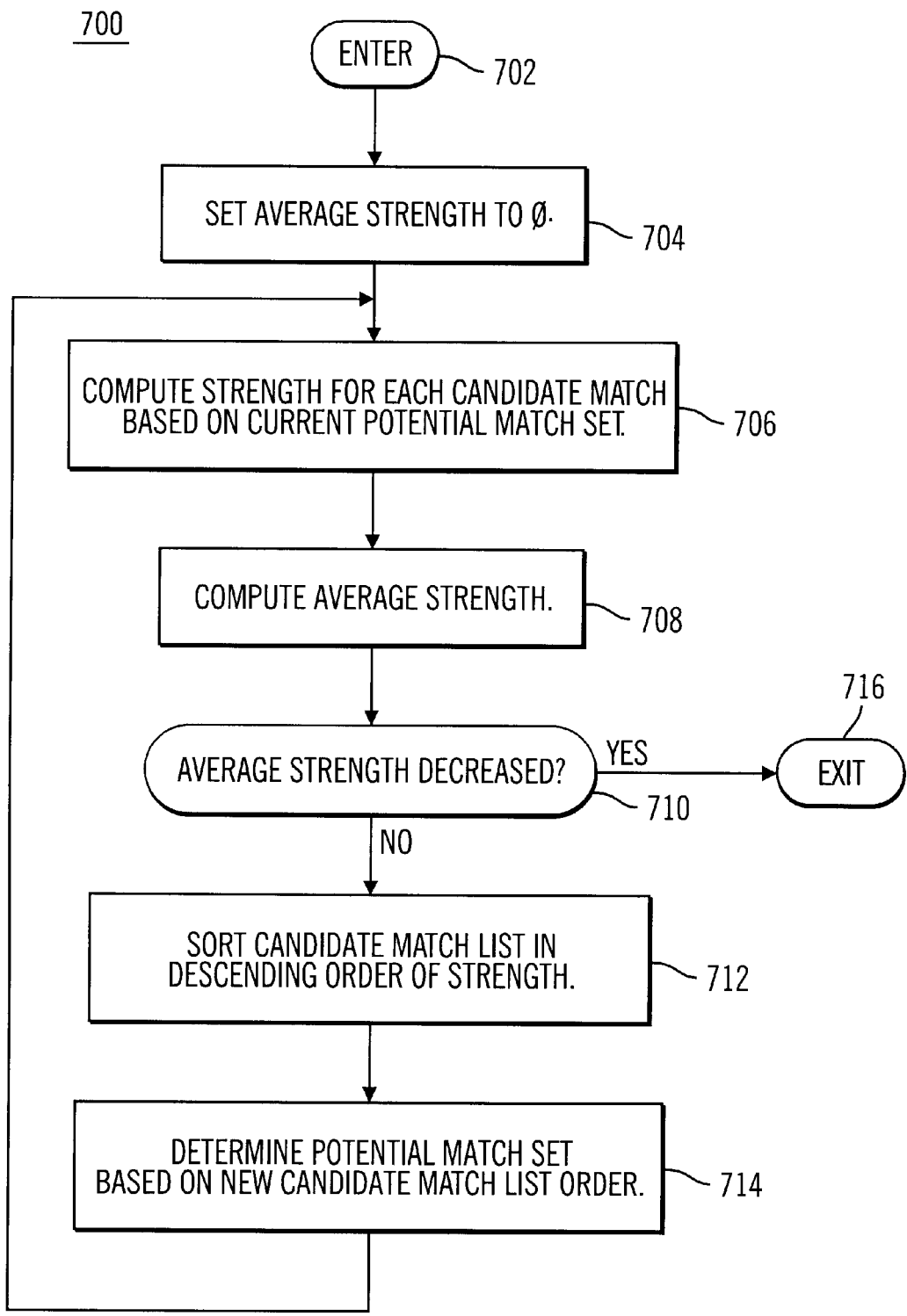
FIG. 7 is an operational flow diagram illustrating a first exemplary operational sequence for the exemplary image matching system of FIGS. 2 and 3, according to a preferred embodiment of the present invention.

Referring to FIG. 7, the controller/processor 312 enters the operational sequence 700, at step 702, and initializes an average strength parameter to zero in the parameter memory 322. At this point, the PMS comes from the cross-correlation stage. The operational sequence then repeats, at steps 706, 708, 710, 712, and 714, until the next average strength is computed to decrease. At such a determination, the method has reached a maximum and therefore will exit, at step 716.

Within the repeated loop, at steps 706, 708, 710, 712, and 714, the controller/processor 312 operates on all candidate matches of all feature points in both images, where each feature point has associated with it a candidate match list 350 of matching feature points in the other image, as has been discussed above with reference to FIG. 5. In addition, each of a collection of feature points 354 is associated with a neighbor list 354 of feature points in the same image. The feature points 356, the neighbor list 354, and the candidate match list 350, are stored and maintained in the image memory 320.

Specifically, the controller/processor 312, operating according to the two-view refined matching module 334, computes the strength for each candidate match based on the current potential match set, at step 706. Then, the controller/processor 312 computes the average strength, at step 708, and determines if the average strength decreases, at step 710. If the average strength continues to increase, the controller/processor 312 then sorts the candidate match list based on new strength computed, at step 712, and then determines, at step 714, the potential match set based on the new candidate match list order. Note that each time at the end of step 714, a different potential match set with higher average strength is formed. Note also that cross-correlation values for matches typically have been calculated by the previous stage 332 and do not have to be repeated in this stage 334 again. This tends to make the overall computations much faster in this stage 334.

Figure 8:
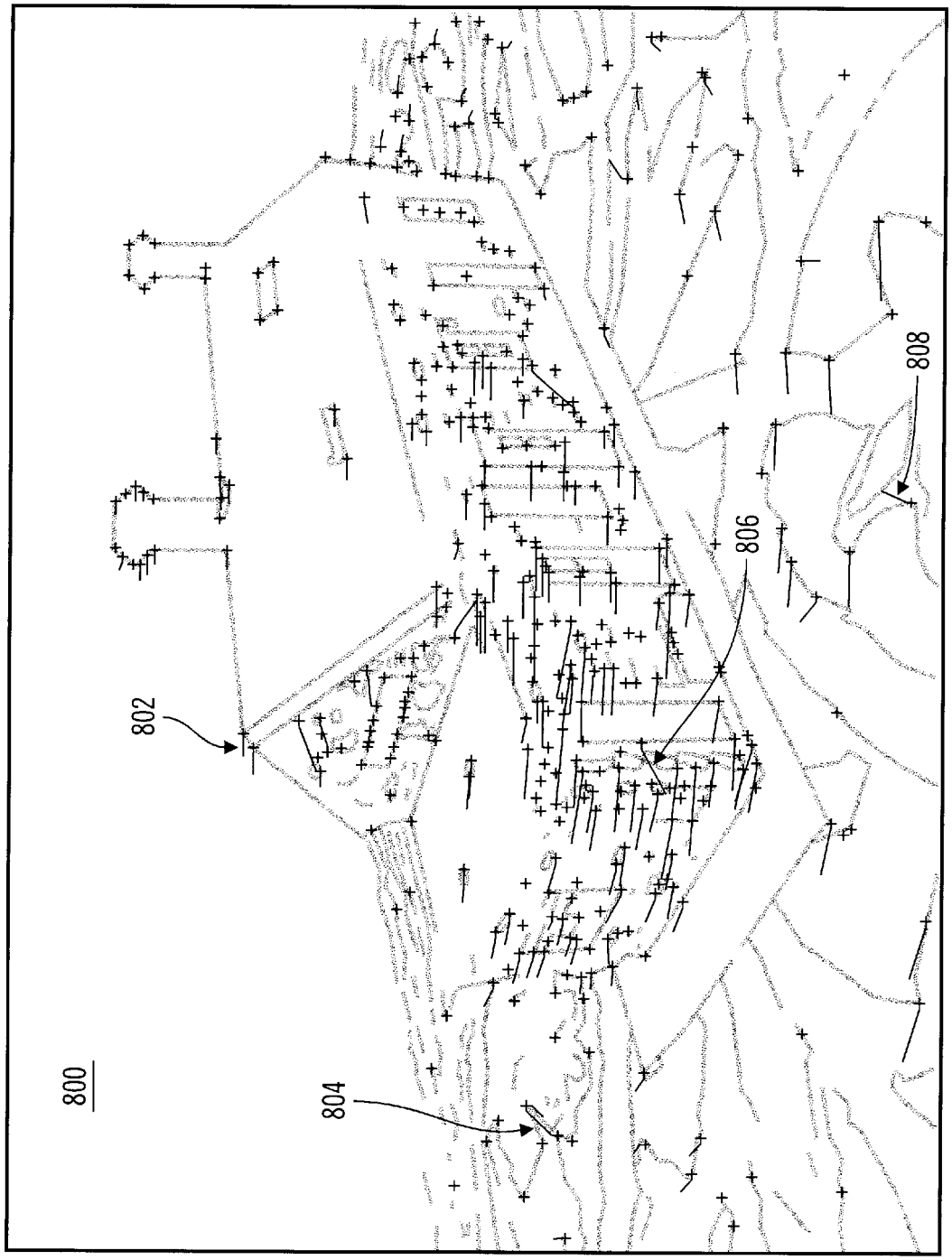
FIG. 8 shows a composite image representing two corresponding images of the scene of FIG. 4, the composite image illustrates motion vectors (with reduced outliers) from a first image to a second image, the two images being processed by the exemplary image matching system of FIGS. 2 and 3 according to a preferred embodiment of the present invention.

FIG. 8 demonstrates an exemplary result after running the two-view refined matching module 334. Empirical evaluation has confirmed that the contamination rate, after utilization of the two-view refined matching module 334, decreases to about less than 10%. By significantly reducing the number of outliers, the two-view refined matching module 334 makes it much more efficient to run the last stage, i.e., the multiple-view robust matching module 336, i.e., within a small number of iterations as will be discussed below. This significant increase in operational efficiency increases the commercial viability of an image matching system implementation according to the present invention. It consequently adds much commercial value to an image matching system implementation utilizing the operation of the very effective multiple view robust image matching module 336, as will be discussed in more detail below.

M-View Robust Matching

A main goal at this stage, i.e., the multiple view robust matching module 336, is to remove the remaining wrong matches (outliers). There are two ingredients in the method: projective reconstruction and the Least Median of Squares method.

First of all, for a much more detailed discussion relating to multiple view robust projective reconstruction and the Least Median of Squares methods, reference is made to the publication by Q. Chen and G. Medioni, entitled "Efficient Iterative Solutions to M-View Projective Reconstruction Problem," Proc. Computer Vision and Pattern Recognition '99, Vol. II: pp. 55–61.

It was shown in the publication identified above that from at least five matches (referred to as a quintuplet in this invention), a geometric structure called projective reconstruction can be found. A projective reconstruction comprises a non-Euclidean, geometrical structure, wherein each camera associated with a view of a scene is represented by a projection matrix, typically a 3 by 4 matrix.

Given a projective reconstruction, a matched point can be computed for each potential match, represented by a four-element coordinate, typically called homogeneous coordinate. A matched point can be projected back (reprojected) to any view by using the projection matrix of the particular camera associated with that view. In each view, the reprojection error of a matched point is the difference between the reprojection of that matched point and the original feature point in that image (in that view). The average reprojection error of a matched point (or equivalently, the source potential match) is the sum of the reprojection error of that matched point in all views divided by the number of views. According to one embodiment of the present invention, it is this average reprojection error that is used in step 914.

If all the five matches of a quintuplet are correct, then all other correct matches must conform to the corresponding reconstruction, that is, they reveal small reprojection errors. The wrong matches (outliers), on the contrary, show large reprojection errors. If some matches of a quintuplet are wrong, then large reprojection errors are expected for both correct and wrong matches. Since, according to a preferred embodiment of the present invention, most of the matches are correct ones after the third stage 334, the median error of all matches with respect to a projective reconstruction is an indication of the correctness of the quintuplet from which the reconstruction is computed. The Least Median of Squares method seeks the quintuplet with the least squared median error. Then, all matches are split into inliers or outliers depending on whether or not it conforms to the projective reconstruction computed from the quintuplet with the least median. The preferred method is summarized in FIG. 9. Running it on the example of FIG. 8 is shown in FIG. 10. Note the significant reduction in outliers and the general conformity in the direction of remaining inlier motion vectors.

Figure 9:
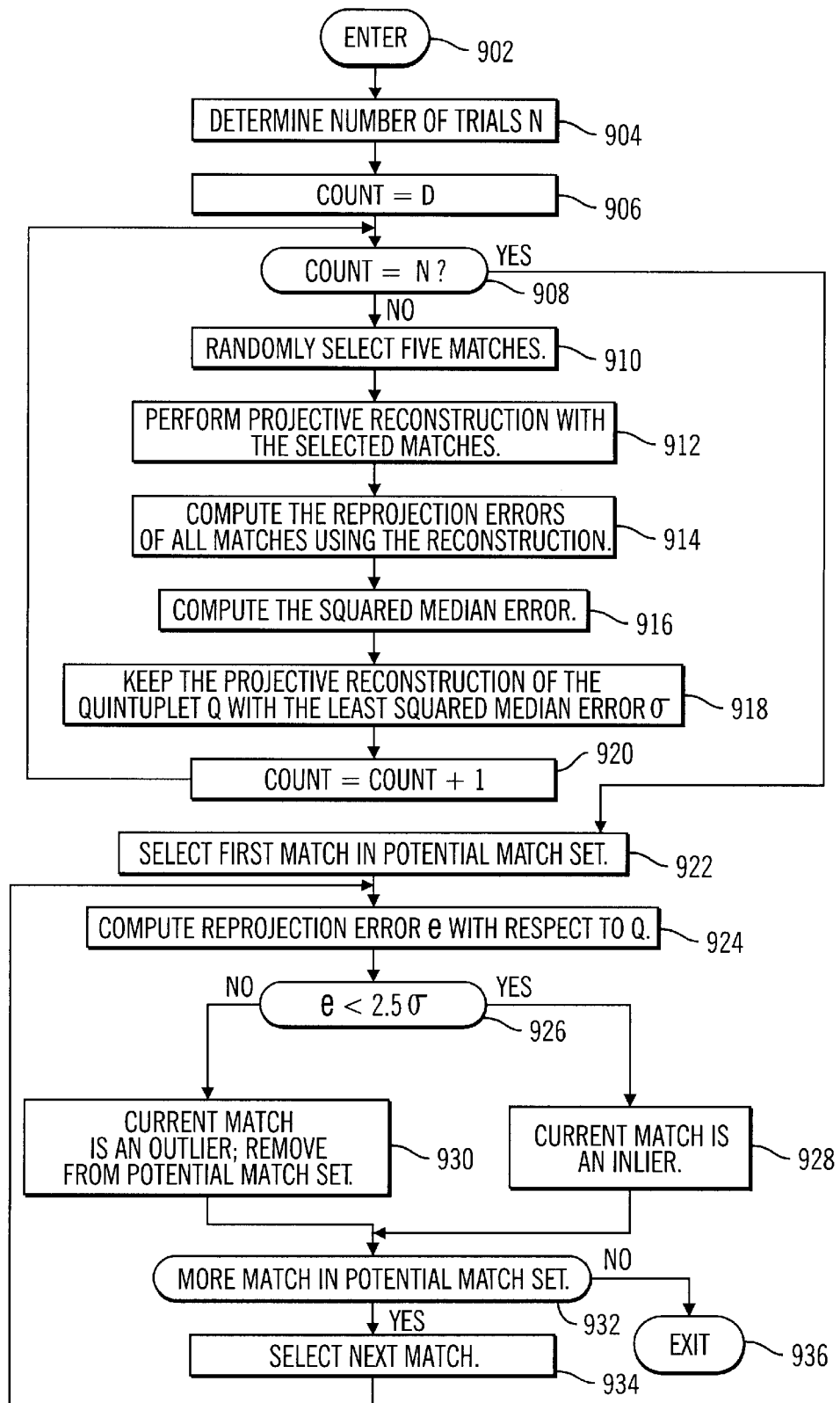
FIG. 9 is an operational flow diagram illustrating a second exemplary operational sequence for the exemplary image matching system of FIGS. 2 and 3, according to a preferred embodiment of the present invention.
Figure 10:
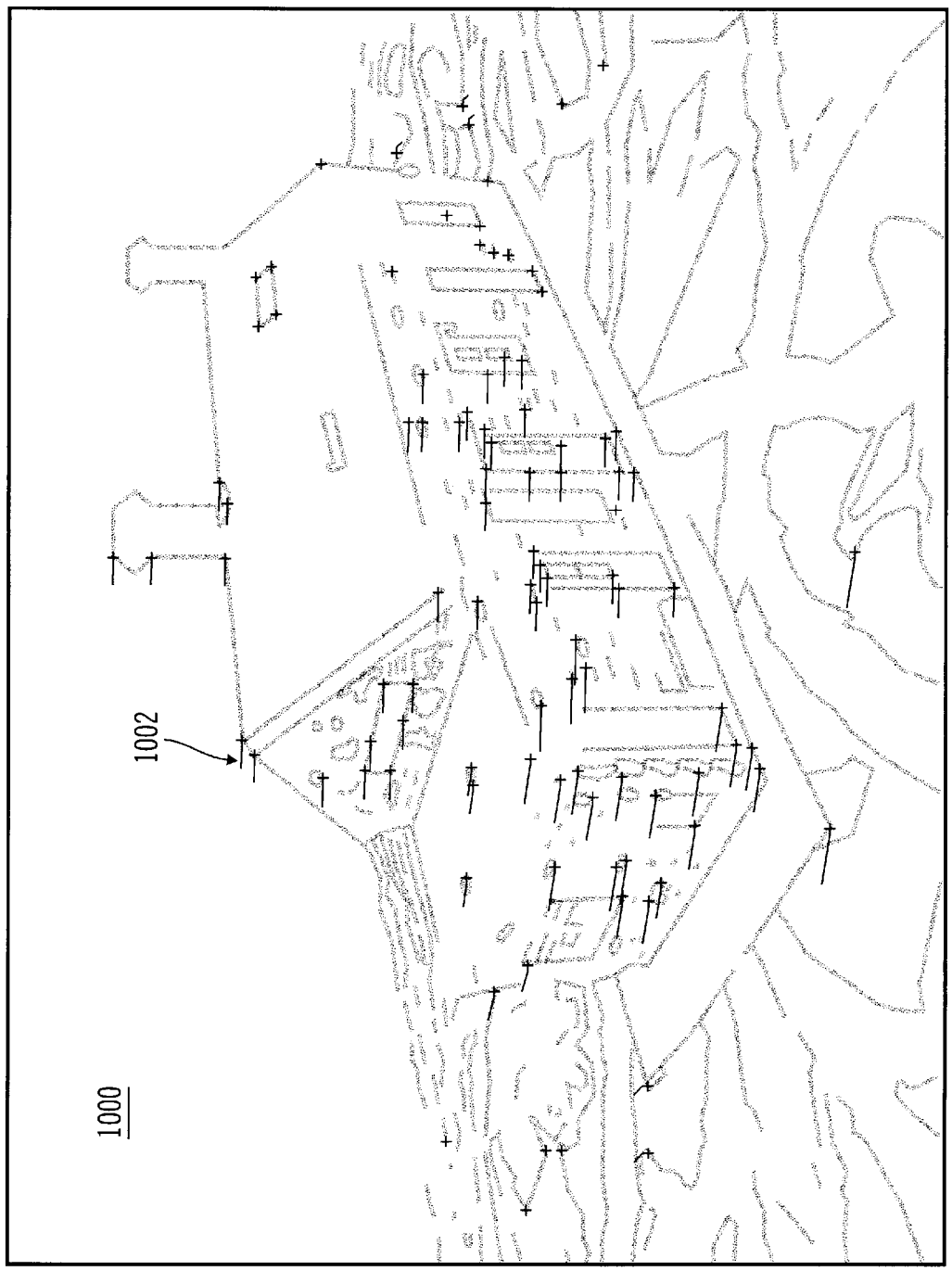
FIG. 10 shows a composite image representing two corresponding images of the scene of FIG. 4, the composite image illustrates motion vectors from a first image to a second image, the two images being processed by the exemplary image matching system of FIGS. 2 and 3 according to a preferred embodiment of the present invention.

Referring to FIG. 9, an operational sequence is shown for the controller/processor 312 operating according to the exemplary multiple-view robust matching module 336. After entering the operational sequence, at step 902, the controller/processor 312, determines, at step 904, the number of trials N. The number of trials is determined from the calculation of N as follows:

$$n = \frac{\log(1-S)}{\log[1-(1-\varepsilon)^5]}$$

where S is the desired success rate for the robust matching methods, which should be chosen close to 1. $\varepsilon$ is the contamination rate before starting the robust matching methods.

As an example to illustrate the effect of reducing $\varepsilon$, assume it is 40%, then to have S=99% requires 86 iterations. However, if $\varepsilon$ becomes 10%, to reach the same success-rate requires only 8 iterations. The computational cost is reduced by almost 90%. Preferably, the contamination rate, i.e., the number of outliers, should start at less than about 50% to significantly improve the efficiency of the M-view robust matching module 336.

The operational sequence, therefore, loops for the number of trials N. The loop consists of a series of steps 908, 910, 912, 916, 918, 920, as shown. For each iteration of the loop, in this example, the controller/processor 312 randomly selects five matches, at step 910, and then performs projective reconstruction, at step 912. Then, the controller/processor 312 computes reprojection errors of all matches, at step 914. The controller/processor 312 then keeps the projective reconstruction (call it PR) of the quintuplet with the least squared median error, at steps 916, 918.

The operational sequence then continues, at steps 924, 926, 928, 930, 932, 934, by computing reprojection error (with respect to PR) of each potential match in the potential match set 352 that resulted from the operational sequence discussed above with reference to FIG. 7. Note that if for any potential match the reprojection error is computed at less than 2.5 times the least median error of the quintuplet, at step 926, this potential match point is considered an inlier. However, if the reprojection error is not at less than 2.5 times the least median error of the quintuplet, at step 926, then this potential match point is considered an outlier and it is removed from the potential match set 352. After all potential match points are examined for reprojection error, at steps 932, 936, the resulting potential match set 352 in data memory 314 comprises a reliable set of inliers representing a reliable match of feature points between corresponding images, i.e., corresponding views of a scene.

Example of 3-D Reconstruction

Figure 11:
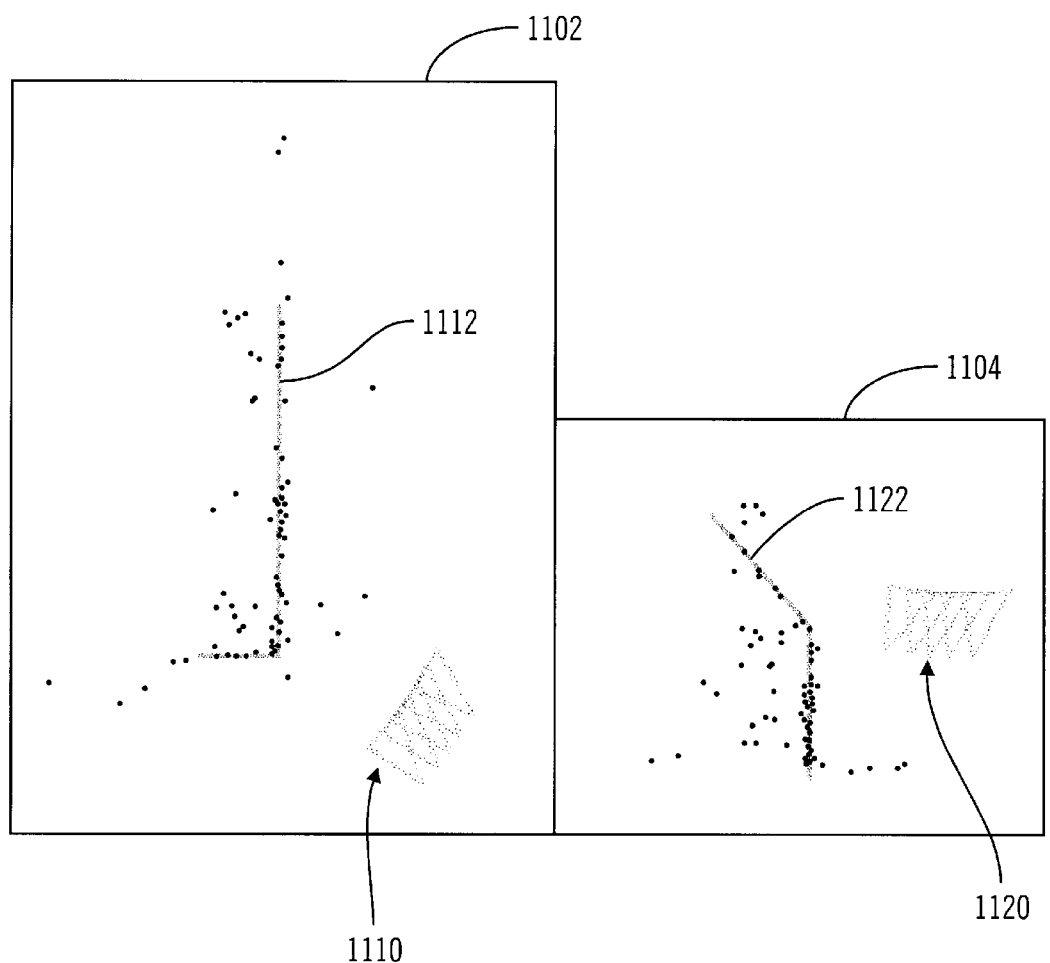
FIG. 11 shows two views of a scene illustrating recovered 3-dimensional feature points in the scene by utilizing the exemplary image matching system of FIGS. 2 and 3 according to a preferred embodiment of the present invention.

What has been discussed above is an image matching system 200 typically constituting a portion of an image processing system. For example, the image processing system can utilize the matched points in an overall 3-dimensional image matching and processing implementation. FIG. 11 demonstrates a preliminary result of what can be achieved after the image matching system 200 provides the feature match points among five views of a scene (one view is shown as FIG. 4, and the other four views are not shown). As shown, the triangles 1110, 1120 indicate recovered camera positions, and the clusters of dots indicate the recovered 3-dimensional feature points. The two lines 1112, 1122, have been added to enhance the reader's visualization of walls of the house in the scene.

Image Matching System Realization

The present invention can be realized in hardware, software, or a combination of hardware and software. A system according to a preferred embodiment of the present invention can be realized in a centralized fashion in one computer system, or in a distributed fashion where different elements are spread across several interconnected computer systems. Any kind of computer system—or other apparatus or integrated circuit adapted for carrying out the methods described herein—is suited. A typical combination of hardware and software could be a general purpose computer system with a computer program that, when being loaded and executed, controls the computer system such that it carries out the methods described herein.

The present invention can also be embedded in a computer program product, which comprises all the features enabling the implementation of the methods described herein, and which—when loaded in a computer system—is able to carry out these methods. Computer program means or computer program in the present context mean any expression, in any language, code or notation, of a set of instructions intended to cause a system having an information processing capability to perform a particular function either directly or after either or both of the following a) conversion to another language, code or, notation; and b) reproduction in a different material form.

Each computer system may include, inter alia, one or more computers and at least a computer readable medium allowing a computer to read data, instructions, messages or message packets, and other computer readable information from the computer readable medium. The computer readable medium may include non-volatile memory, such as ROM, Flash memory, Disk drive memory, CD-ROM, and other permanent storage. Additionally, a computer medium may include, for example, volatile storage such as RAM, buffers, cache memory, and network circuits. Furthermore, the computer readable medium may comprise computer readable information in a transitory state medium such as a network link and/or a network interface, including a wired network or a wireless network, that allow a computer to read such computer readable information.

The image matching system according to the present invention provides significant advantages over the known prior art. The present image matching system can be much more accurate at matching image feature points between multiple images (views) than prior art systems. Additionally, the present image matching system can efficiently analyze many more images, i.e., more than two or three images as in the prior art, to do the matching much more reliably. Furthermore, by using multiple images, such as a larger number than two or three, the present image matching system can span an overall wide interval in an image sequence while still maintaining a very reliable and accurate analysis of matching image features across the multiple images. This is a significant advantage over prior art systems that analyze only two views or possibly three views at a time. An image sequence using only two or three cameras may significantly vary across successive image views and make it difficult if not impossible to find correspondence between images. On the other hand, the image matching system of the present invention can utilize a much higher number of cameras that allow capturing a series of successive images with much less variation, e.g., much less distance, between successive images. The image matching system according to the present invention may provide the only practicable approach to capturing and matching corresponding image features across multiple images.

Accordingly, due to the remarkable efficiency of the embodiments of the present invention, an implementation in an integrated circuit (IC) chip is very feasible and desirable. Generally, a circuit supporting substrate and associated circuits, such as provided by an IC, a circuit board, and a printed circuit card, and other similar embodiments, and including the functional modules according to the present invention as discussed above, can provide a modular solution for enabling a computer system to benefit from the very accurate image matching methods according to the present invention. Such electronic devices as a three dimensional scanner and a 3-dimensional video image capture system are commercially feasible. Additionally, since the system according to the present invention can beneficially utilize many more cameras, e.g., more than one camera, and even more than two or three cameras, then the image capture and image matching methods of the present invention can advantageously operate both with a still object in a scene as well as with a moving object in a scene.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method of matching image feature points between a plurality of images, the method comprising the steps of:
   detecting a plurality of image feature points in a first image corresponding to a first view of a scene;
   detecting a plurality of image feature points in a second image corresponding to a second view of the scene, wherein the second image deviates from the first image as a result of camera relative motion;
   determining a first two-view correspondence between the plurality of detected feature points in the first image and the plurality of detected image feature points in the second image resulting in a first potential match set of candidate image feature points between the first and second images; and
   determining a second two-view correspondence, that is a refinement of the first two-view correspondence, resulting in a second potential match set of candidate image feature points between the first and second images, wherein the second potential match set is determined to have a maximum average strength of correspondence based at least in part on the total number of matching neighbor candidate image feature points for each match of the second potential match set.

2. The method of claim 1, wherein the step of determining the first two-view correspondence results in a first potential match set of candidate image feature points between the first and second images based on the value of cross-correlation between the candidate image feature points.

3. The method of claim 1, further comprising the steps of:
   generating a list of neighbor image feature points for each image feature point in the plurality of image feature points for the first image; and
   generating a list of neighbor image feature points for each image feature point in the plurality of image feature points for the second image.

4. A method of matching image features between a plurality of images, the method comprising the steps of:
   detecting a plurality of image features in a first image corresponding to a first view of a scene;
   detecting a plurality of image features in a second image corresponding to a second view of the scene, wherein the second image deviates from the first image as a result of camera relative motion;
   determining a first two-view correspondence between the plurality of detected features in the first image and the plurality of detected image features in the second image resulting in a first potential match set of candidate image features between the first and second images;
   determining a second two-view correspondence, that is a refinement of the first two-view correspondence, resulting in a second potential match set of candidate image features between the first and second images, wherein the second potential match set is determined to have a maximum average strength of correspondence based at least in part on the total number of matching neighbor candidate image features for each match of the second potential match set; and
   calculating the strength of correspondence for each match of the second potential match set using a strength function defined as follows:

$$Strength(f_1, f_2) = \sum_j \frac{CrossCorrelation(f_1 + n_{1j}, f_2 + n_{2j})}{1 + |n_{1j} - n_{2j}|},$$

where $n_{ij}$ (i=1,2; j=1,2, . . . ) is the vector from feature $f_i$ to its $j^{th}$ neighbor.

5. The method of claim 4, wherein the second potential match set comprises a contamination rate of about less than 10%.

6. A method of matching image feature points between a plurality of images, the method comprising the steps of:
   detecting a plurality of image feature points in a first image corresponding to a first view of a scene;
   detecting a plurality of image feature points in at least a second image corresponding to a respective at least a second view of the scene, wherein the at least a second image deviates from the first image as a result of camera relative motion;
   determining a first two-view correspondence between the plurality of detected image feature points in the first image and a plurality of detected image feature points in one of the at least a second image resulting in a first potential match set of candidate image feature points between the first image and the one of the at least a second image; and
   determining a multiple-view correspondence between the plurality of detected image feature points in the first image and the plurality of detected image feature points in the at least a second image, the multiple-view correspondence being a refinement of the first two-view correspondence, resulting in a second potential match set of candidate image feature points between the first image and the at least a second image, wherein the second potential match set is based at least in part on a computation of reprojection error for matched points that resulted from a projective reconstruction of the second potential match set.

7. The method of claim 6, wherein the second potential match set is based at least in part on a least median of squares computation of the reprojection errors related to match points in the second potential match set.

8. The method of claim 6, wherein the first potential match set comprises a contamination rate of about less than 50%.

9. A method of matching image features between a plurality of images, the method comprising the steps of:
   detecting a plurality of image features in a first image corresponding to a first view of a scene;

detecting a plurality of image features in at least a second image corresponding to a respective at least a second view of the scene, wherein the at least a second image deviates from the first image as a result of camera relative motion;

determining a first two-view correspondence between the plurality of detected features in the first image and a plurality of detected image features in one of the at least a second image resulting in a first potential match set of candidate image features between the first image and the one of the at least a second image;

determining a multiple-view correspondence between the plurality of detected features in the first and the plurality of detected image features in the at least a second image, the multiple-view correspondence being a refinement of the first two-view correspondence, resulting in a second potential match set of candidate image features between the first image and the at least a second image, wherein the second potential match set is based at least in part on a computation of reprojection error for matched points that resulted from a projective reconstruction of the second potential match set; and;

calculating the strength of correspondence for each match of the first potential match set using a strength function defined as follows:

$$Strength(f_1, f_2) = \sum_j \frac{CrossCorrelation(f_1 + n_{1j}, f_2 + n_{2j})}{1 + |n_{1j} - n_{2j}|},$$

where $n_{ij}$ (i=1,2; j=1,2, . . . ) is the vector from feature $f_i$ to its $j^{th}$ neighbor.

10. The method of claim 9, wherein the first potential match set comprises a contamination rate of about less than 10%.

11. An image processing system comprising:
a memory;
a controller/processor electrically coupled to the memory;
an image feature point detector, electrically coupled to the controller/processor and to the memory, for detecting a plurality of image feature points in a first image corresponding to a first view of a scene, and for detecting a plurality of image feature points in at least a second image corresponding to a respective at least a second view of the scene, wherein the at least a second image deviates from the first image as a result of camera relative motion; and
an image matching module, electrically coupled to the controller/processor and to the memory, for determining a multiple-view correspondence between the plurality of detected image feature points in the first image and the plurality of detected image feature points in the at least a second image, resulting in a potential match set of candidate image feature points between the first image and the at least a second image, wherein the potential match set is based at least in part on a computation of reprojection error for matched points that resulted from a projective reconstruction of the potential match set.

12. The system of claim 11, further comprising at least one camera interface, electrically coupled to the controller/processor, for sending image information from at least one camera to the controller/processor.

13. The system of claim 11, wherein the controller/processor, the memory, the image feature point detector, and the image matching module, are implemented in at least one of an integrated circuit, a circuit supporting substrate, and a scanner.

14. An image processing system comprising:
a memory;
a controller/processor electrically coupled to the memory;
an image feature point detector, electrically coupled to the controller/processor and to the memory, for detecting a plurality of image feature points in a first image corresponding to a first view of a scene, and for detecting a plurality of image features points in at least a second image corresponding to a respective at least a second view of the scene, wherein the at least a second image deviates from the first image as a result of camera relative motion; and
an image matching module, electrically coupled to the controller/processor and to the memory, for determining a two-view correspondence resulting in a potential match set of candidate image feature points between the first image and the at least a second image, wherein the potential match set is determined to have a maximum average strength of correspondence based at least in part on the total number of matching neighbor candidate image feature points for each match of the potential match set.

15. The system of claim 14, wherein the controller/processor, the memory, the image feature point detector, and the image matching module, are implemented in at least one of an integrated circuit, a circuit supporting substrate, and a scanner.

16. An image processing system comprising:
a memory;
a controller/processor electrically coupled to the memory;
an image feature detector, electrically coupled to the controller/processor and to the memory, for detecting a plurality of image features in a first image corresponding to a first view of a scene, and for detecting a plurality of image features in at least a second image corresponding to a respective at least a second view of the scene, wherein the at least a second image deviates from the first image as a result of camera relative motion;
an image matching module, electrically coupled to the controller/processor and to the memory, for determining a two-view correspondence resulting in a potential match set of candidate image features between the first image and the at least a second image, wherein the potential match set is determined to have a maximum average strength of correspondence based at least in part on the total number of matching neighbor candidate image features for each match of the potential match set; and
calculating the strength of correspondence for each match of the potential match set using a strength function defined as follows:

$$Strength(f_1, f_2) = \sum_j \frac{CrossCorrelation(f_1 + n_{1j}, f_2 + n_{2j})}{1 + |n_{1j} - n_{2j}|},$$

where $n_{ij}$ (i=1,2; j=1,2, . . . ) is the vector from feature $f_i$ to its $j^{th}$ neighbor.

17. The system of claim 16, wherein the resulting potential match set comprises a contamination rate of about less than 10%.

18. A computer readable medium including computer instructions for matching image feature points between a plurality of images, the computer instructions comprising instructions for:

detecting a plurality of image feature points in a first image corresponding to a first view of a scene;

detecting a plurality of image feature points in a second image corresponding to a second view of the scene, wherein the second image deviates from the first image as a result of camera relative motion;

determining a first two-view correspondence between the plurality of detected feature points in the first image and the plurality of detected image feature points in the second image resulting in a first potential match set of candidate image feature points between the first and second images; and determining a second two-view correspondence, that is a refinement of the first two-view correspondence, resulting in a second potential match set of candidate image feature points between the first and second images, wherein the second potential match set is determined to have a maximum average strength of correspondence based at least in part on the total number of matching neighbor candidate image feature points for each match of the second potential match set.

19. A computer readable medium including computer instructions for matching image features between a plurality of images, the computer instructions comprising instructions for:

detecting a plurality of image features in a first image corresponding to a first view of a scene;

detecting a plurality of image features in a second image corresponding to a second view of the scene, wherein the second image deviates from the first image as a result of camera relative motion;

determining a first two-view correspondence between the plurality of detected features in the first image and the plurality of detected image features in the second image resulting in a first potential match set of candidate image features between the first and second images;

determining a second two-view correspondence, that is a refinement of the first two-view correspondence, resulting in a second potential match set of candidate image features between the first and second images, wherein the second potential match set is determined to have a maximum average strength of correspondence based at least in part on the total number of matching neighbor candidate image features for each match of the second potential match set; and calculating the strength of correspondence for each match of the second potential match set using a strength function defined as follows:

$$Strength(f_1, f_2) = \sum_j \frac{CrossCorrelation(f_1 + n_{1j}, f_2 + n_{2j})}{1 + |n_{1j} - n_{2j}|},$$

where $n_{ij}$ (i=1,2; j=1,2, . . . ) is the vector from feature $f_i$ to its $j^{th}$ neighbor.

20. The computer readable medium of claim 19, wherein the second potential match set comprises a contamination rate of about less than 10%.

21. A computer readable medium including computer instructions for matching image feature points between a plurality of images, the computer instructions comprising instructions for:

detecting a plurality of image feature points in a first image corresponding to a first view of a scene;

detecting a plurality of image feature points in at least a second image corresponding to a respective at least a second view of the scene, wherein the at least a second image deviates from the first image as a result of camera relative motion;

determining a first two-view correspondence between the plurality of detected image feature points in the first image and a plurality of detected image feature points in one of the at least a second image resulting in a first potential match set of candidate image feature points between the first image and the one of the at least a second image; and determining a multiple-view correspondence between the plurality of detected image feature points in the first image and the plurality of detected image feature points in the at least a second image, the multiple-view correspondence being a refinement of the first two-view correspondence, resulting in a second potential match set of candidate image feature points between the first image and the at least a second image, wherein the second potential match set is based at least in part on a computation of reprojection error for matched points that resulted from a projective reconstruction of the second potential match set.

22. The computer readable medium of claim 21, wherein the second potential match set is based at least in part on a least median of squares computation of the reprojection errors related to match points in the second potential match set.

23. A computer readable medium including computer instructions for matching image features between a plurality of images, the computer instructions comprising instructions for:

detecting a plurality of image features in a first image corresponding to a first view of a scene;

detecting a plurality of image features in at least a second image corresponding to a respective at least a second view of the scene, wherein the second image deviates from the first image as a result of camera relative motion;

determining a first two-view correspondence between the plurality of detected features in the first image and a plurality of detected image features in one of the at least a second image resulting in a first potential match set of candidate image features between the first image and the one of the at least a second image; determining a multiple-view correspondence between the plurality of detected features in the first image and the plurity of detected image features in the at least a second potential the multiple-view correspondence being a refinement of the first two-view correspondence, resulting in a second potential match set of candidate image features between the first image and the at least a second image, wherein the second potential match set is based at least in part on a computation of reprojection error for matched points that resulted from a projective reconstruction of the second potential match set; and calculating the strength of correspondence for each match of the first potential match set using a strength function defined as follows:

$$Strength(f_1, f_2) = \sum_j \frac{CrossCorrelation(f_1 + n_{1j}, f_2 + n_{2j})}{1 + |n_{1j} - n_{2j}|},$$

where $n_{ij}$ (i=1,2; j=1,2, . . . ) is the vector from feature $f_i$ to its $j^{th}$ neighbor.

24. The method of claim 23, wherein the first potential match set comprises a contamination rate of about less than 10%.

* * * * *